United States Patent [19]

Miyairi et al.

[11] 3,761,587

[45] Sept. 25, 1973

[54] ANTIBIOTIC THIOPEPTIN AND PROCESS OF PRODUCTION

[75] Inventors: Norimasa Miyairi, Suita; Toshio Miyoshi, Ibaraki; Masanobu Kohsaka, Suita; Koichi Ikushima, Toyonaka; Hiroshi Imanaka, Ikeda, all of Japan

[73] Assignee: Fujisama Pharmaceutical Co., Ltd., Osaka, Japan

[22] Filed: Feb. 23, 1971

[21] Appl. No.: 118,152

Related U.S. Application Data

[63] Continuation-in-part of Ser. No. 829,900, June 3, 1969, abandoned, and a continuation-in-part of Ser. No. 91,308, Nov. 20, 1970, abandoned.

[52] U.S. Cl.................................. 424/117, 195/80
[51] Int. Cl............................................ A61k 21/00

[58] Field of Search....................... 424/117; 195/80

[56] References Cited
OTHER PUBLICATIONS
Derwent Farmdoc Number 41,511, Abstracting G.E. 1,929,355, Published December 1967.

Primary Examiner—Jerome D. Goldberg
Attorney—Sylvester J. Liddy et al.

[57] ABSTRACT

The antibiotic thiopeptin of the present invention comprising thiopeptins $A_1$, $A_2$, $A_3$, $A_4$ and B is produced by culturing Streptomyces tateyamensis A.T.C.C. 21,389 in an aqueous nutrient medium under submerged aerobic conditions. It exhibits antimicrobial activities against a variety of microorganisms and is useful as an animal feed supplement.

9 Claims, 7 Drawing Figures

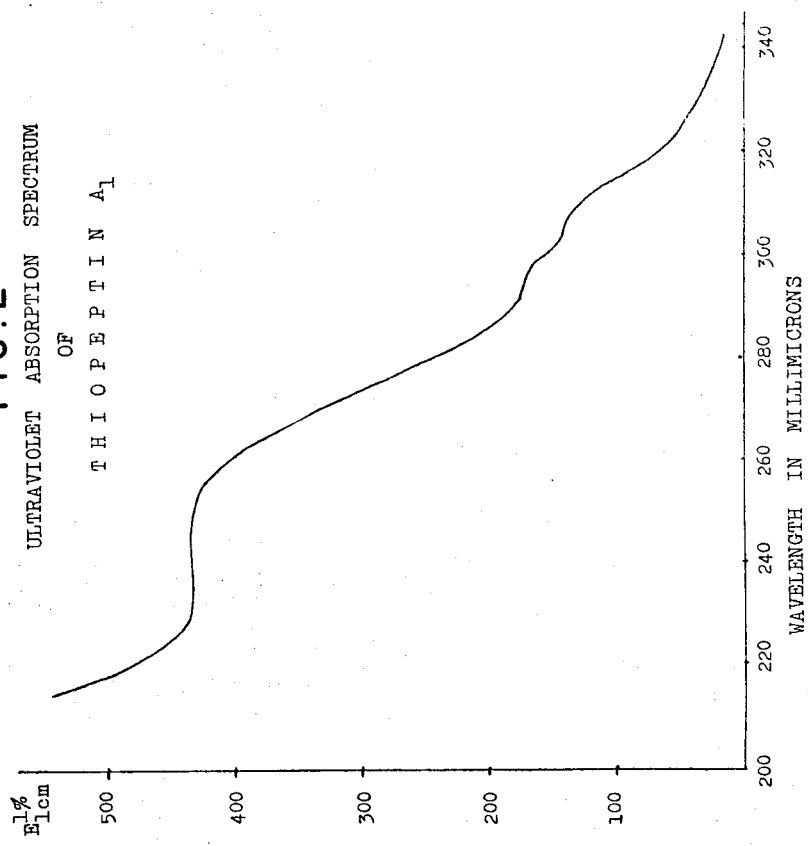
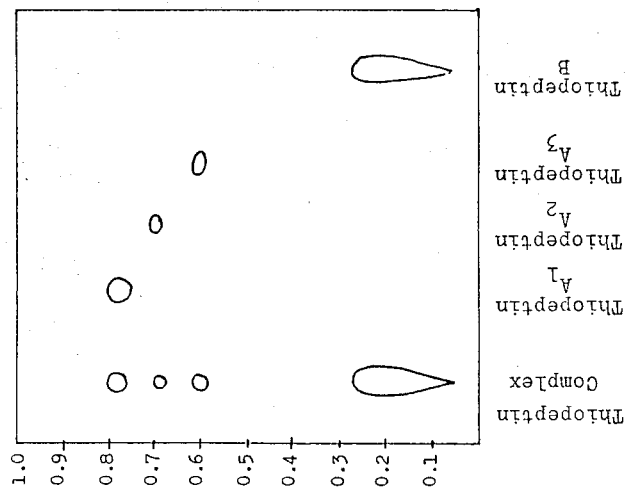

ULTRAVIOLET ABSORPTION SPECTRUM
OF
THIOPEPTIN A$_3$

ULTRAVIOLET ABSORPTION SPECTRUM
OF
THIOPEPTIN B

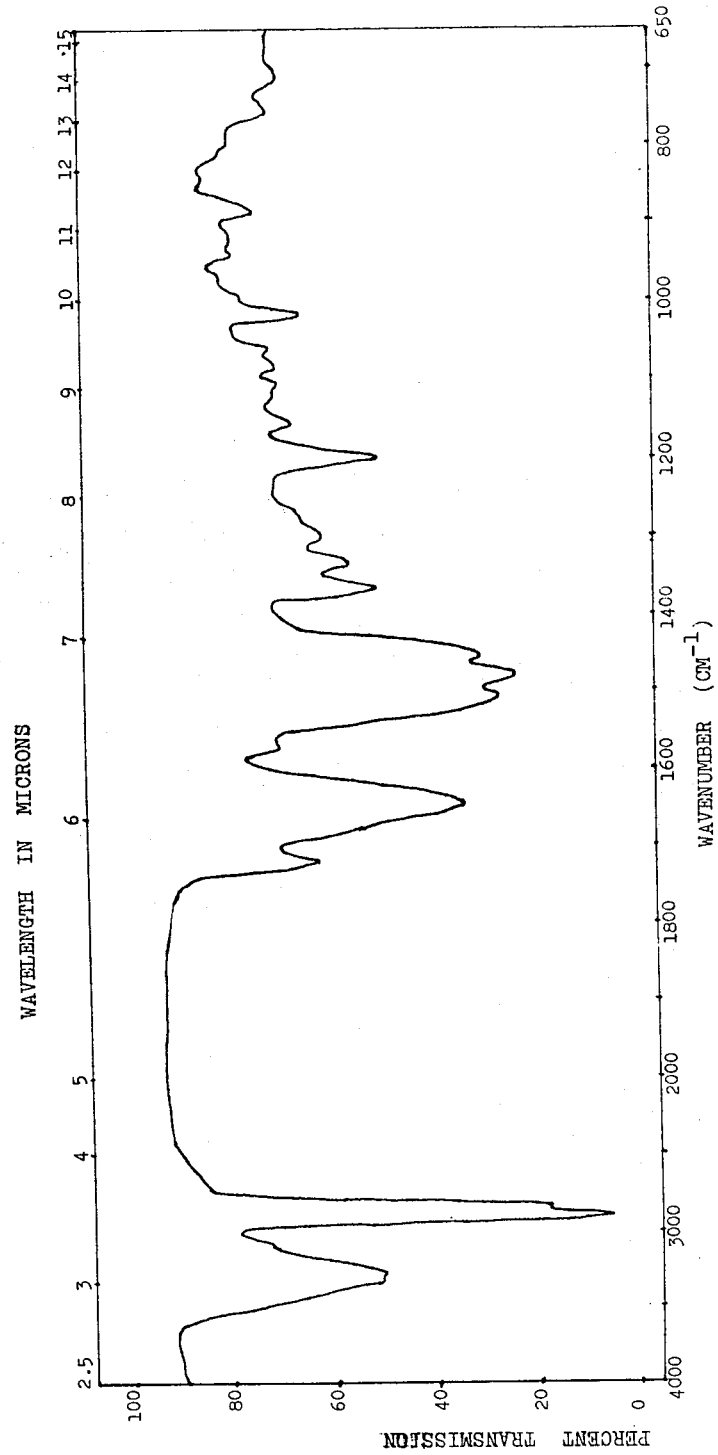
FIG. 5: INFRARED ABSORPTION SPECTRUM OF THIOPEPTIN $A_1$

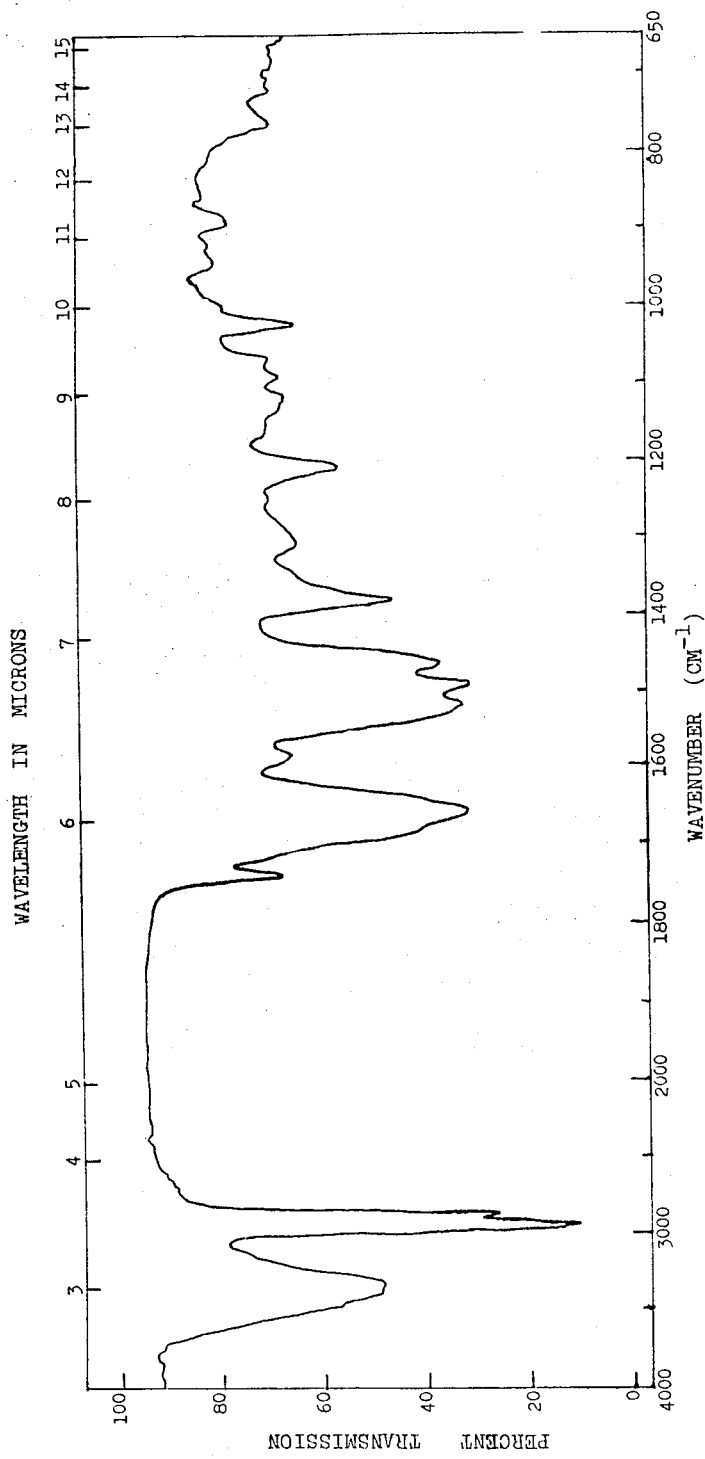
FIG. 6: INFRARED ABSORPTION SPECTRUM OF THIOPEPTIN A₃

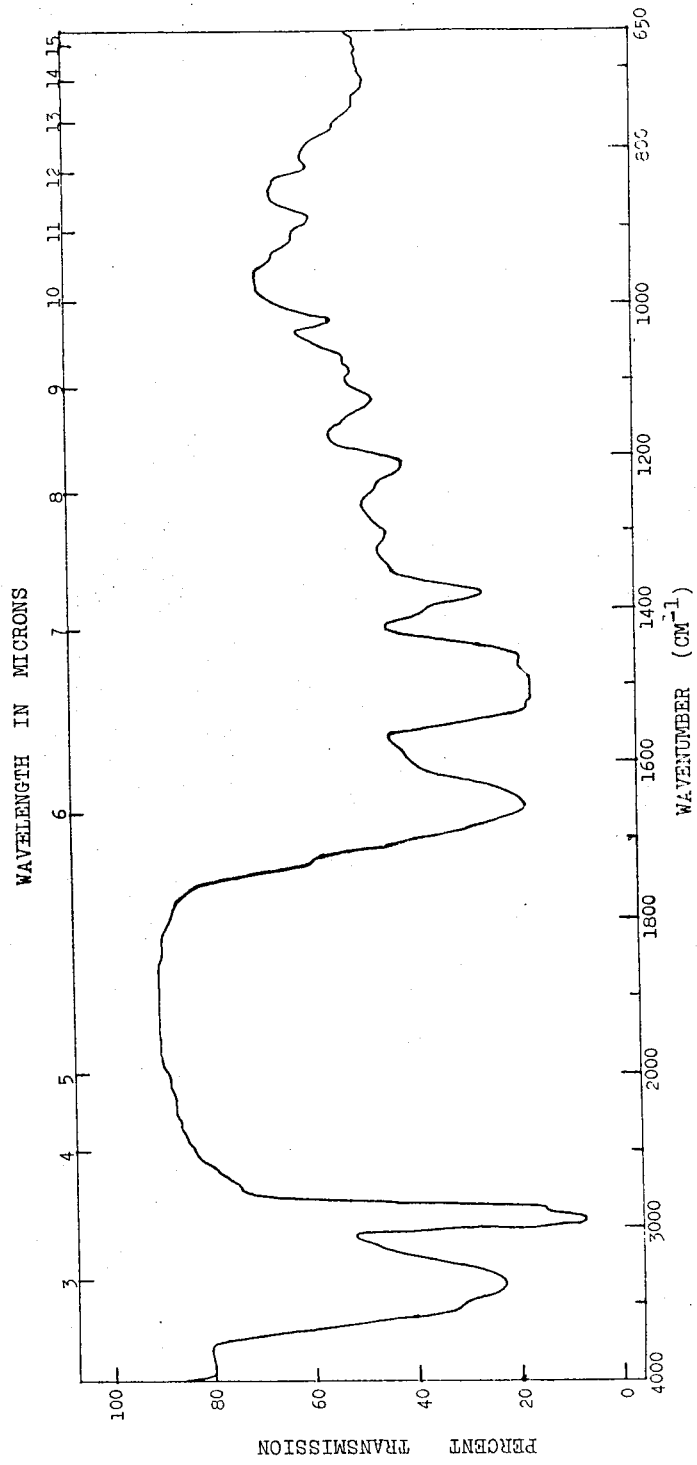

ANTIBIOTIC THIOPEPTIN AND PROCESS OF PRODUCTION

CROSS-REFERENCE TO RELATED APPLICATIONS

The present invention is a continuation-in-part application of both copending application Ser. No. 829,900, filed June 3, 1969, now abandoned and entitled "ANTIBIOTIC THIOPEPTIN AND METHOD OF PRODUCTION," and copending application Ser. No. 91,308, filed Nov. 20, 1970, now abandoned and entitled "A NEW COMPONENT OF ANTIBIOTIC THIOPEPTIN AND ITS PRODUCTION."

BACKGROUND OF THE INVENTION

1. Field of the Invention

The present invention relates to an antibiotic thiopeptin and to a process for the production thereof. More particularly, it relates to the antibiotic thiopeptin and to a process for its production by fermentation and methods for its recovery and purification, to an animal feed additive containing such antibiotic, and to a method of using the same in feed to animals as animal feed additive.

2. Description of the Prior Art

A variety of antibiotics have recently found use as an animal feed supplement in promoting growth in animals and improving rate of weight gain and efficiency of feed conversion. However, most of such antibiotics are also useful as antibacterial agents in the treatment of human diseases caused by a variety of microorganisms. This raises increasing fears of exerting an unfavorable influence upon human beings because of their antibiotic residues which tend to induce human beings' resistance to drugs necessary in the therapy of bacterial infections.

SUMMARY OF THE INVENTION

It is one object of the present invention to provide a novel antibiotic thiopeptin which is useful as an animal feed additive in promoting growth in animals and improving rate of weight gain and efficiency of feed conversion and which does not remain in the flesh, internal organs or eggs of the animals to which the antibiotic is fed, at such a level as to exert an unfavorable influence upon human beings and/or which, even if present within present assay limits in the intestinal cavity of the animals, is destroyed at said level or disappears rapidly when the antibiotic feeding is discontinued.

Another object of the present invention is to provide a process for the preparation of said thiopeptin.

A further object of the present invention is to provide a highly effective animal feed additive containing such new antibiotic thiopeptin.

Still another object of the present invention is to provide a method of using said thiopeptin as animal feed additive.

Other objects and advantageous features of the present invention will become apparent from a consideration of the following description.

The novel antibiotic thiopeptin of the present invention is prepared, for instance, by culturing *Streptomyces tateyamensis* or closely related mutants thereof under submerged aerobic conditions in an aqueous nutrient medium containing a source of carbon and a source of nitrogen until substantial antibiotic activity is imparted to said medium by the production of thiopeptin and, if desired, recovering thiopeptin from the medium and, if desired, separating thiopeptin from the medium.

The organism producing thiopeptin according to the present invention was isolated from a soil sample collected in Tateyama, Toyama Prefecture, Japan, and was identified as a new species of *Streptomyces* type genus. It was designated as *Streptomyces tateyamensis*, and a culture of the living organism has been deposited in the American Type Culture Collection, Maryland, U.S.A., under A.T.C.C. 21,389.

The morphology of the culture was microscopically observed on Bennett's agar. The hyphae of this culture are thick and straight, and form tufts. The conidium with the smooth surface was rather large in size and long-elliptical, but some rectangular conidia were observed.

*Streptomyces Tateyamensis* nov. sp. ATCC 21389 has the following cultural characteristics when grown on the indicated media for 10 to 14 days at 30° C.

Czapek's agar : Growth faint, colorless; no aerial mycelium; no soluble pigment.

Starch ammonium agar : Growth abundant, yellowish brown in periphery, white in center; aerial mycelium, thick, brownish white, powdery; no soluble pigment. Remarks: Starch vigorously hydrolyzed.

Glucose asparagine agar : Growth flat, dark brown; aerial mycelium, spreading, white, powdery; no soluble pigment.

Calcium malate agar : Growth flat, faint brown; aerial mycelium, white, powdery; no soluble pigment.

Tyrosine agar : Growth faint brown; aerial mycelium, spreading, faintly brownish white, powdery; no soluble pigment.

Bouillon agar : Poor growth, colorless; no aerial mycelium; no soluble pigment.

Bennett's agar: Growth faint brown; aerial mycelium, faintly greyish white, powdery, spreading; no soluble pigment. Remarks: Rather poor growth at 37°C.

Gelatin stab: Faint growth; no aerial mycelium; no soluble pigment. Remarks: Weak liquefaction. The culture was obseved after incubation at room temperature for 20 days.

Glucose-Czapek's solution: Small white colonies precipitated; no aerial mycelium; no soluble pigment. Remarks: No nitrites produced.

Glucose-Bouillon : Faint grey colonies grown on surface; no aerial mycelium; no soluble pigment. Remarks: The pH value changed slightly to acidic range.

Milk: Faint grey colonies grown on surface; no aerial mycelium; no soluble pigment. Remarks: Peptonization and coagulation negative.

Potato plug: Growth faint brown, wrinkled; no aerial mycelium; no soluble pigment.

Cellulose: No growth.

The carbon utilization of Streptomyces tateyamensis was determined according to the method described by Pridham and Gottlieb. In the following table are set forth the results of carbon utilization tests, and therein the symbols employed to indicate growth response have the following meanings:

(+) = probable utilization, and (−) = questionable utilization.

TABLE 1: Carbon Utilization Pattern for *Streptomyces tateyamensis*.

| | |
|---|---|
| Arabinose | (+) |
| Fructose | (−) |

| | |
|---|---|
| Glucose | (+) |
| Inositol | (−) |
| Lactose | (+) |
| Mannitol | (−) |
| Mannose | (−) |
| Raffinose | (−) |
| Rhamnose | (−) |
| Salicin | (−) |
| Sucrose | (+) |
| Trehalose | (−) |
| Xylose | (−) |

For the production of thiopeptin it is to be understood that the present invention is not limited to the use of the particular organism described herein, but includes inter alia, mutants produced from the described organism by mutating agents, such as X-ray, ultraviolet radiation, phage exposure, and nitrogen mustards.

Thiopeptin according to the present invention is produced by culturing Streptomyces tateyamensis in an aqueous nutrient medium under submerged aerobic conditions. The nutrient medium useful for the cultivation of Streptomyces tateyamensis producing thiopeptin includes both a source of carbon, for example, an assimilable carbohydrate and a source of nitrogen, for example, an assimilable nitrogen compound or proteinaceous material. Other examples of sources of carbon are starch, glucose, sucrose, glycol, and the like. Other examples of sources of nitrogen are meat extract, peptone, gluten meal, soybean meal, cotton seed meal, corn steep liquor, dry yeast, yeast extract, ammonium sulfate, sodium nitrate, casamino acid, urea, and the like. Combination of the sources of carbon and nitrogen may be used advantageously. Inorganic salts capable of yielding ions such as potassium, sodium, calcium, phosphate, sulfate, and the like, may be incorporated in the medium. Trace elements such as magnesium, manganese, zinc, iron, and the like, also may be included in the culture medium. Such trace elements, however, may be supplied usually as impurities incidental to the addition of the constituents of the medium. It is to be understood, therefore, that the addition of such trace metals is made effectively when the organism cultured requires them as a component of the medium. Furthermore, vitamins such as inositol, vitamin $B_{12}$, isoascorbic acid, biotin, and the like, may be added. When vigorous foaming occurs, the use of a defoaming agent such as silicone is preferred.

For maximum yield of thiopeptin from the culture medium, the addition of sulfur compounds, either organic or inorganic, is preferably made. Examples of the compounds are N-acetyl-DL-methionine, methionine, 2-naphthol-6,8-di-sulfonic acid, sodium sulfosalicylate, sodium acetylsulfate, taurine, thionine, methyl orange, sodium sulfate, and so on. Among such sulfur compounds are preferred N-acetyl-DL-methionine and sodium sulfate.

Optimum yields of thiopeptin are given when the culture is carried out at a temperature conductive to satisfactory growth of the organism between about 24 °C. to about 37 °C., preferably at 27 °C. to about 32 °C., for a period of about 2 days to about 6 days in a pH range of about pH 5.2 to about pH 7.0, preferably at about pH 5.6 to about pH 6.2.

When the fermentation is completed, the culture broth is then subjected to a variety of procedures commonly used for recovery and purification of antibiotics, for instance, solvent extraction with an appropriate solvent or a mixture of such solvents, chromatography, or recrystallization from an appropriate solvent or a mixture of such solvents.

In accordance with the present invention, the culture broth is separated by filtration and the resulting mycelium cakes then subjected to recovery with an appropriate organic solvent or a mixture of such solvents as acetone, ethyl acetate, methanol, and the like. Acetone is the preferred extraction solvent. The extract is concentrated by evaporation or distillation to a smaller amount and the resulting residue dissolved in an appropriate solvent in which thiopeptin forms as a crystalline material. For this purpose, n-hexane, petroleum ether, and the like where the antibiotic is insoluble is preferably used as a solvent. The impure crystalline material thus formed may be purified by routinely used purification procedures, for instance, chromatography or recrystallization from an appropriate solvent or a mixture of such solvents.

It is to be understood that thiopeptin is a complex composed of four components. The determination was made in the analysis of thin-layer chromatography of the impure crystalline material of thiopeptin using as an irrigation system a chloroform-methanol solvent mixture in a volume ratio of 10 : 1. The thiopeptin components were arbitrarily designated as thiopeptins $A_1$, $A_2$, $A_3$ and B. From the thin-layer chromatogram analyses with a chloroform-methanol (9 : 1) solvent mixture as shown in FIG. 1, the Rf values for the four components were determined as follows:

TABLE 2 : Rf Values for Thiopeptin Components

| Components: | Rf Values: |
|---|---|
| Thiopeptin $A_1$ | 0.78 |
| Thiopeptin $A_2$ | 0.68 |
| Thiopeptin $A_3$ | 0.60 |
| Thiopeptin B | 0.19 |

It is further to be understood that a thiopeptin complex includes another component, herein designated as thiopeptin $A_4$.

The thiopeptin components containing thiopeptin $A_4$ individually display certain characteristics similar to those of other antibiotics, not previously produced or disclosed. The thiopeptin components tested differ physically from thiostrepton, siomycin, sporangiomycin, and substance A–59. as shown below under Table 3 in which there are mentioned the Rf values measured by an ascending paper chromatography of a thin-layer chromatography with various irrigation solvent systems.

TABLE 3: Rf Values for Thiopeptin and Other Antibiotics

| Antibiotics | Irrigation Systems* | | | | |
|---|---|---|---|---|---|
| | A | B | C | D | E |
| Thiostrepton | 0.50 | 0.30 | 0.38 | 0.43 | 0.38 |
| Siomycin | 0.50 | 0.30 | 0.29 | 0.43 | 0.14 |
| Sporangiomycin | 0.50 | 0.30 | 0.27 | 0.41 | 0.14 |
| Substance A–59 | 0.50 | 0.30 | 0.27 | 0.43 | 0.14 |
| Thiopeptin $A_1$ | 0.83 | 0.48 | 0.73 | 0.95 | 0.18 |
| Thiopeptin $A_3$ | 0.60 | 0.37 | 0.48 | 0.57 | 0.52 |
| Thiopeptin $A_4$ | 0.50 | 0.30 | 0.38 | 0.57 | 0.38 |
| Thiopeptin B | 0.10 | 0.00 | 0.00 | 0.00 | 0.23 |

*) The irrigation systems as used above are as follows:-

| Ingredients | Volume Ratio |
|---|---|
| A) Chloroform : methanol | 9 : 1 |
| B) Chloroform : methanol | 19 : 1 |
| C) Chloroform : n-butanol | 6 : 1 |
| D) Ethyl acetate : n-hexane : 2N-ammonia | 4 : 1 : 1 |
| E) Methanol : acetic acid : water | 25 : 3 : 72 |

The thiopeptin components may be separated by dissolving the impure crystalline material of thiopeptin, produced by fermentation, in an appropriate organic solvent such as chloroform and the like, and then by chromatographing the solution on silica gel in a column with an appropriate organic solvent or a mixture of such solvents. The solvent mixture of chloroform and methanol is preferred. By use of the system in a volume ratio of abut 20 : 1 to about 50 : 1, the thiopeptin A components, including thiopetins $A_1$, $A_2$, $A_3$ and $A_4$, may be separated into each component. On the other hand, thiopeptin B may be separated by elution with, for instance, a chloroform-methanol solvent mixture in a ratio of about 4 : 1 to about 9 : 1 by volume.

A mixture of the thiopeptin A components may be separated into thiopeptins $A_1$, $A_2$, $A_3$ and $A_4$ by further chromatography on silica gel with an appropriate solvent or a mixture of such solvents. For this purpose, a mixture of chloroform and methanol is preferred.

In accordance with the present invention, a precipitate which forms during the reaction is separated from the reaction mixture by methods commonly used for this purpose, and the resulting reaction product may be subjected to routinely used purification procedures, for instance, to recrystallization from an appropriate solvent or a mixture of such solvents.

DESCRIPTION OF THE PREFERRED EMBODIMENT

Figure 3:
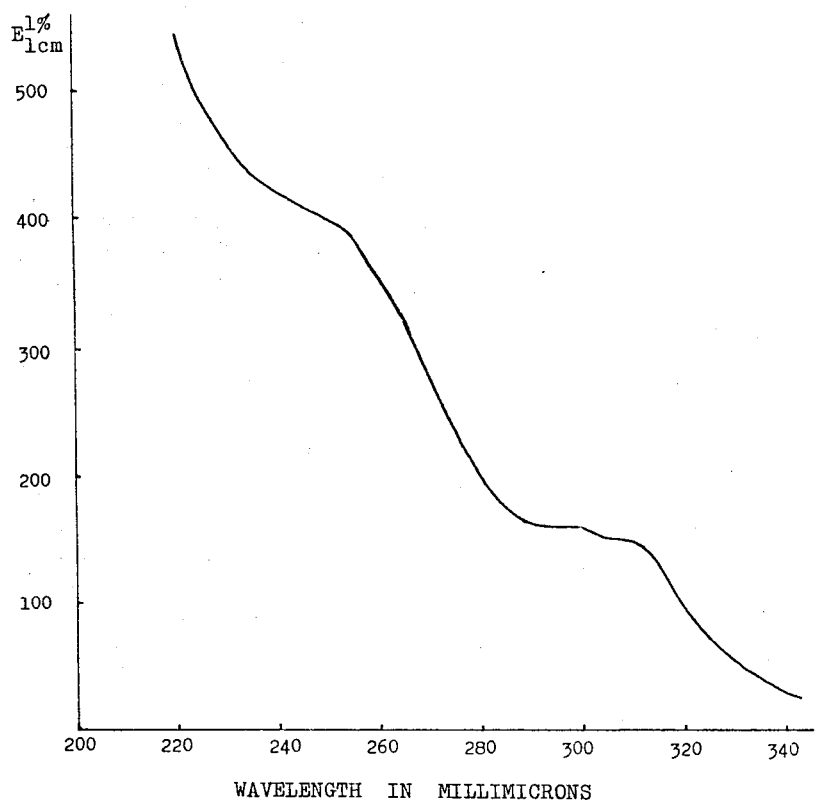

The following examples illustrate more in detail the production of a seed culture, production of thiopeptin, and separation of the thiopeptin components, but are not to be construed as limiting.

EXAMPLE 1

Production of A Seed Culture

*Streptomyces tateyamensis* A.T.C.C. 21,389 was grown on an agar plate at 30 °C. for 4 days for use in producing the seed culture. The inoculum thus produced was then inoculated onto a Bennett's agar slant and incubated for 7 days at 30 °C.

EXAMPLE 2

Production of Thiopeptin

A. Fermentation Processes

The seed culture of *Streptomyces tateyamensis* A.T.C.C. 21,389 prepared in Example 1 was used for fermentation process by which the thiopeptin components was produced. The resulting slant culture was inoculated onto a sterile medium containing, in 100 ml. of water, the following ingredients:

| Medium Ingredients | Percentages |
|---|---|
| Potato starch | 2.0 |
| Cotton seed meal | 2.0 |
| Corn steep liquor | 1.0 |
| Calcium carbonate | 0.3 |
| Potassium dihydrogen phosphate | 2.18 |
| Disodium hydrogen phosphate·12H₂O | 1.43 |

After incubating for 2 days at 30 °C., the culture was transferred to a sterile 30-liter stainless fermenter containing 20 liters of said medium. The culture was then incubated for 48 hours at 30 °C. while passing in 20 liters of sterile air per minute on a rotary shaker operating at 300 r.p.m.

Alternatively, the seed culture was fermented by substantially the same procedures as described above using a sterile medium containing, in 100 ml. of water, the following ingredients:

| Medium Ingredients: | Percentages: |
|---|---|
| Potato starch | 4.0 |
| Cotton seed meal | 2.0 |
| Corn steep liquor | 1.0 |
| Dry yeast | 1.0 |
| Calcium carbonate | 0.3 |
| Potassium dihydrogen phosphate | 2.18 |
| Disodium hydrogen phosphate·12H₂O | 1.43 |
| N-Acetyl-DL-methionine | 0.17 |

Alternatively, the seed culture was fermented by substantially the same procedures as stated above using a sterile medium containing, in 100 ml. of water, the following ingredients:

| Ingredients | Percentages |
|---|---|
| Potato starch | 2.0 |
| Cotton seed meal | 2.0 |
| Corn steep liquor | 1.0 |
| Dry Yeast | 1.0 |
| Calcium carbonate | 0.3 |
| Potassium dihydrogen phosphate | 2.18 |
| Disodium hydrogen phosphate·12H₂O | 1.43 |
| Sodium sulfate | 0.5 |

B. Recovery Processes

The resulting culture produced above was filtered and 1.8 kilograms of the resulting mycelium cake were extracted with a chloroform-methanol solvent mixture in a ratio of 2 : 1 by volume at 50 °C. This extraction was repeated three times. The combined extracts were filtered and concentrated to dryness. The residue was dissolved in 200 ml. of chloroform. To this solution 200 ml. benzene was added and the resulting precipitate was separated. The filtrate was concentrated by evaporation to leave a residue which was then dissolved in about the 10-fold amount of n-hexane so as to form a crystalline material of thiopeptin.

Alternatively, the mycelium cake obtained as above was extracted with acetone, and the resulting extract was concentrated to leave a residue which was then extracted with ethyl acetate. The resulting extract was concentrated to a smaller amount and then cooled to give a crude crystalline material of thiopeptin.

EXAMPLE 3

Separation of Thiopeptin A Components

The crude material of thiopeptin obtained was chromatographed in a column on silica gel with a chloroform methanol solvent mixture of a volume ration of 50 : 1. The resulting eluate was concentrated to dryness leaving a residue which was dissolved in acetone and then allowed to stand below room temperature so as to form the thiopeptin A components as a brown powder.

EXAMPLE 4

Separation of Thiopeptin $A_1$

The thiopeptin A components obtained were further chromatographed in a column on silica gel with a chloroform methanol solvent in a volume ratio of 50 : 1. The eluate was then concentrated by evaporation to leave a residue which was dissolved in acetone and kept cooling to give thiopeptin $A_1$ as a crystalline material.

EXAMPLE 5

Separation of Thiopeptins $A_2$, $A_3$ and $A_4$

Thiopeptin $A_2$, $A_3$ and $A_4$ were separated as a crystalline material by substantially the same procedures as described under Example 4.

EXAMPLE 6

Separation of Thiopeptin B

After the thiopeptin A components were separated by the procedure as described in Example 3, the crude material was further chromatographed in a column on silica gel with a chloroform-methanol (9 : 1 by volume) solvent mixture. The resulting eluate was concentrated to leave a residue which was dissolved in chloroform and then chromatographed in a column on silicic acid with a mixture of chloroform and methanol of a ratio of 50:1 by volume. The resulting eluate was concentrated to a smaller amount and the residue dissolved in acetone. The solution was cooled below 10 °C. so as to give thiopeptin B as a crystalline material.

PHYSICAL AND CHEMICAL PROPERTIES the thiopeptin components thus separated show all the substantial common chemical and physical properties. Thiopeptins $A_1$, $A_2$, $A_3$ and B are all soluble in dioxane, dimethylsulfoxide, dimethylformamide, pyridine, chloroform, and 3N-hydrochloric acid; slightly soluble in methanol, acetone, and ethyl acetate; and insoluble in ether, benzene, n-hexane, petroleum ether and water. They exhibit each positive reaction in permangante test; and negative in ninhydrin, biuret, Fehling, ferric chloride, Ehrlich and Dragendorff tests. They are stable at 60°C. for 1 hour at a pH range of about pH 2.0 to about pH 8.0. Thiopeptin $A_4$ is soluble in dioxane, dimethylsulfoxide, pyridine and chloroform; slightly soluble in methanol, acetone and ethyl acetate; and insoluble in ether, benzene, petroleum ether and water. Thiopeptin $A_4$ exhibits positive reaction in permanganate test; and negative one in ninhydrin, biuret, Fehling and ferric chloride tests. It is also stable at 60 °C. for 1 hour at a pH range of about 2.0 to about 8.0.

The following shows other chemical and physical properties of thiopeptins $A_1$, $A_2$, $A_3$, $A_4$ and B.

Thiopeptin $A_1$

This is a pale yellow crystalline material having melting or decomposition points between about 223 °C. and 226 °C. The optical rotation is: $[\alpha]_D^{23} = -71°$ (c.=1.0 in chloroform). It has the molecular weight of 1637 as determined by vapor pressure method having the following elemental analysis: C = 49.38; H = 4.93; N = 14.22; and S = 11.72. Its ultraviolet absorption spectrum in methanol shows in FIG. 2 shoulders at 230 to 250 m$\mu$, 295 m$\mu$ and 305 m$\mu$. As shown in FIG. 5 the infrared spectrum in a Nujol mull exhibits absorption bands at about 3400, 3330, 3150, 1718, 1655, 1585, 1508, 1492, 1338, 1305, 1275, 1245, 1205, 1160, 1135, 1123, 1113, 1092, 1065, 1028, 1002, 973, 950, 923, 893, 850, 820, 805, 765 and 723 cm$^{-1}$. It was hydrolyzed with 6N-hydrochloric acid at 100 °C. and observed by ninhydrin test to include valine, cystine, threonine and proline as amino acid components.

Thiopeptin $A_2$

It is a pale yellow cyrstalline material.

Thiopeptin $A_3$

It is a pale yellow crystalline material having melting or decomposition points between about 232 °C and about 236 °C. Its optical rotation is $[\alpha]_D^{23} = -10.8°$ (c.=1 in chloroform). Its molecular weight is 1972 by vapor pressure method having the following elemental analysis:
C = 48.45; H = 5.11; N = 14.46; and S = 12.09. This compound exhibits ultraviolet absorption shoulders, as shown in FIG. 3, in methanol, at 235 to 255 m$\mu$, 285 to 300 m$\mu$, and 302 to 310 m$\mu$, and infrared absorption maxima, in Nujol mull, at about 3386, 3320, 1725, 1655, 1583, 1518, 1490, 1305, 1210, 1160, 1130, 1115, 1090, 1070, 1028, 1000, 945, 920, 890, 860, 765, 720, and 710 cm$^{-1}$, as shown in FIG. 6.

Thiopeptin $A_4$

This compound is a pale yellow crystalline material having melting and decomposing points at 236 °C. to 245 °C. Its optical rotation is $[\alpha]_D^{23} = -81.5°$ (c.=1.0 in chloroform). Its molecular weight is 1854 as determined by vapor pressure method having the following analysis: C = 50.13; H = 5.30; N = 15.22; and S = 12.02. Its ultraviolet absorption spectrum in FIG. 8 shoulders at 235 to 250 m$\mu$, 295 m$\mu$ and 303 to 308 m$\mu$. This compound exhibits infrared absorption maxima in Nujol mull, as seen in FIG. 9, at about 3340, 3330, 1735, 1655, 1585, 1530, 1490, 1420, 1345, 1305, 1250, 1210, 1160, 1110, 1090, 1065, 1025, 1000, 975, 950, 920, 895, 880, 860, 840, 768, 725, 705, 680, and 660 cm$^{-1}$.

Thiopetin B

Figure 4:
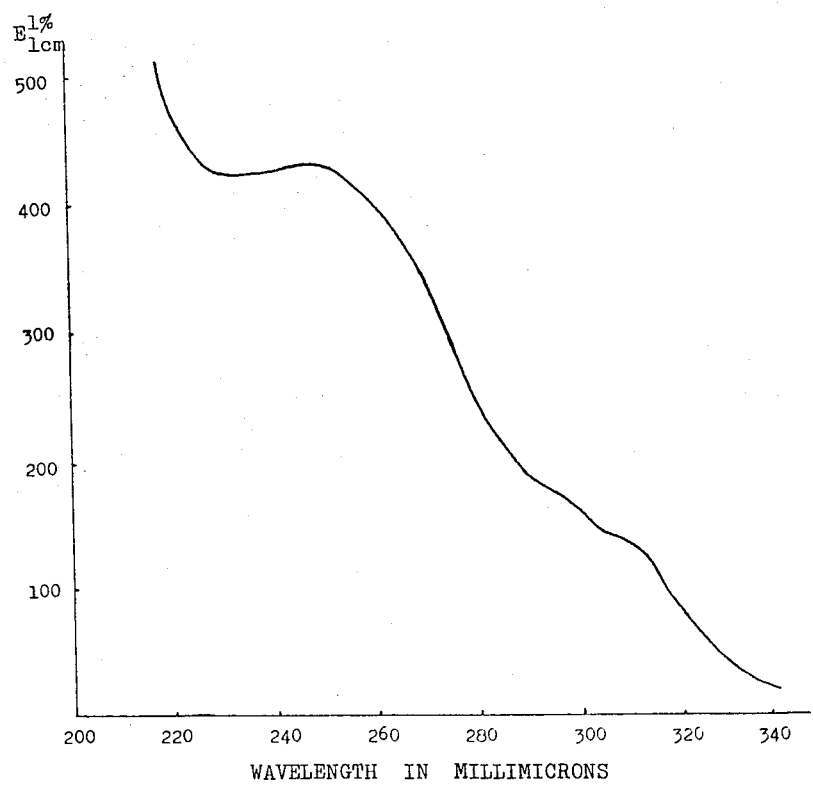

This compound is a pale yellow crystalline material having melting or decomposition points between about 219 °C. and about 222 °C. It exhibit an optical rotation of $[\alpha]_D^{23} = -80°$ (c.=1.0 in chloroform). Its molecular weight is 1942 as determined by vapor pressure method showing the following elemental analysis: C = 48.73; H = 4.87; N = 14.30 and S = 11.04. This compound exhibits ultraviolet absorption shoulder in methanol, as shown in FIG. 4, at 230 to 250 m$\mu$, 295 m$\mu$ and 305 m$\mu$, and infared absorption maxima in Nujol mull, as shown in FIG. 7, at about 3400, 3300, 3160, 1735, 1685, 1660, 1650, 1640, 1585, 1510, 1485, 1335, 1305, 1270, 1250, 1240, 1205, 1165, 1130, 1120, 1110, 1095, 1070, 1025, 1005, 975, 950, 930, 895, 820, 765, 725, and 705 cm$^{-1}$.

PHARMACOLOGICAL TESTS

The antimicrobial activity was tested for thiopeptins $A_1$, $A_3$, $A_4$ and B. the following table shows the activities of the compounds expressed in mcg./ml. by the minimal concentration by which the growth of the organisms tested was inhibited. The tests were performed with the organisms by using a glucose bouillon culture medium. The test medium was incubated at 30 °C. for 24 hours to 72 hours.

TABLE 4: THE MINIMAL INHIBITORY CONCENTRATION

| Microorganisms | Thiopeptins | | | |
|---|---|---|---|---|
| | $A_1$ | $A_3$ | $A_4$ | B |
| Staphylococcus aureus 208-P | 0.10 | 0.25 | 0.06 | 0.10 |
| Bacillus subtilis | 0.10 | 0.25 | 0.25 | 0.05 |
| Bacillus megaterium | 0.10 | 0.25 | 0.25 | 0.05 |
| Sarcina lutea | 0.05 | 0.06 | 0.01 | 0.025 |
| Corynebacterium xerosis | 0.05 | 0.25 | 0.25 | 0.01 |
| Escherichia coli | <100.0 | <100.0 | <128.0 | <100.0 |
| Proteus vulgaris | <100.0 | <100.0 | - | <100.0 |
| Pseudomonas aeruginosa | <100.0 | <100.0 | <128.0 | <100.0 |
| Mycobacterium SP-607 | ≦100.0 | 8.0 | - | 50.0 |
| Mycobacterium phlei | 50.0 | 32.0 | 8.0 | 50.0 |

The acute toxicity of the thiopeptin components, when administered intraperitoneally into mice, was tested with a 5 percent suspension in sodium carboxymethyl cellulose. The doses of thiopeptin $A_1$, $A_3$, $A_4$ and B, lethal to 50 percent of the animals tested, were found to be above 500, 250, 250 and 250 mg./kg., respectively.

UTILITY AS ANIMAL FEED ADDITIVES

As stated hereinabove, thiopeptin according to the present invention may beadvantageously used as an animal feed additive in promoting the growth and improving rate of weight gain and feed efficiency of animals such as swine and poultry. For such purpose, the thiopeptin components may be used in less pure forms such as dried mycelium cake containing the components. The thiopeptin components, alone or in combination thereof or as in the form of the mycelium cake, may be admixed with basal rations ordinarily used in animal feeding. The amounts of the thiopeptin components in the basal rations which are fed to the animals may be varied over a very wide range depending, among other things useful in growing animals, upon the properties of the components and the nature of the animals. Levels which are construed as preferable and anticipated to yield maximum growth responses are in an amount between about 0.1 p.p.m. and about 100 p.p.m. for chickens and between about 10 p.p.m. and about 500 p.p.m. for pigs.

The thiopeptin components of the present invention, when fed to chicks and pigs at such levels as stated above, were undetectable in the serum and the tissues of their internal organs of the animals tested. Though trace quantities of the antibiotic residues could be present within present assay limits in the intestinal cavity, it is to be pointed out that, in view of the fact that the antibiotic residues were not encountered in the flesh of the animals, the thiopeptin components have been destroyed at an undetectable level and have disappeared rapidly when the antibiotic feeding was discontinued for a few days prior to slaughter. It is to be added, therefore, that such components, when fed in admixture with the basal rations at appropriate levels, do not have unfavorable and undesirable influences upon animals nor on human beings.

The following examples serve to describe more in detail the effects of the thiopeptin components, alone or in combination thereof or as in the form of mycelium cakes, fed to chicks and pigs.

EXAMPLE 7

The six groups of 40 chicks, each on an equalized weight basis, were experimented; four groups for treatment and two for control. The control groups were fed with the basal ration as listed hereinafter and the treatment groups fed with 5 p.p.m. and 20 p.p.m. of the thiopeptins in the feed mixture. The results are shown in Tables 5 and 6.

The basal ration has the following ingredients in percentages by weight:

| Ingredients | | Percentages |
|---|---|---|
| Corn | | 41.00 |
| Milo | | 25.00 |
| Soybean meal | 19.10 | |
| Fish meal | 8.00 | |
| Fat | 4.00 | |
| Calcium carbonate | 1.40 | |
| Tricalcium phosphate | 0.85 | |
| Methionine | 0.10 | |
| Sodium chloride | 0.29 | |
| Special mixture* | 0.26 | |

*) lg. of the above special mixture consists of corn containing 5,000 IU vitamin A, 1,000 IU vitamin $D_3$, 5 IU vitamin E, 0.5 mg. vitamin $B_1$, 4.0 mg. vitamin $B_2$, 0.5 vitamin $B_6$, 5 μg. vitamin $B_{12}$, 5 mg. calcium pantothenate, 5 mg. nicotinic amide, 100 mg. choline chloride, 0.05 mg. folic acid, 0.5 mg. vitamin $K_4$, 25 mg. Mg, 5 mg. Fe, 0.3 mg. Cu, 15 mg. Zn, 0.15 mg.Co, 0.25 mg. I, and 25 mg. furazolidone.

EXAMPLE 8

The five groups of 36 hatched chicks, each on an equalized weight basis, were experimented; the four for treatment and the one for control. The basal ration which was fed to the control are mentioned below. For the treatment, the use of 2.5 or 10 p.p.m. of a mixed additives of thiopeptins $A_1$, $A_3$ and B, and the mycelium cakes as well was experimented. The mycelium cakes comprised 4.9 to 49.9 percent thiopeptin $A_1$, less than 0.1 percent thiopeptin $A_2$, 1.5 to 10 percent thiopeptins $A_3$ and $A_4$ and 75 to 90 percent thiopeptin B. The results are shown in Table 7 as below. The basal ration is as follows:

| Ingredients | Percengages |
|---|---|
| Corn | 51.51 |
| Milo | 14.00 |
| Soybean meal | 20.00 |
| Fish meal | 8.00 |
| Defatted rice bran | 1.00 |
| Alfalfa | 3.00 |
| Tricalcium phosphate | 1.00 |
| Calcium carbonate | 0.70 |
| Sodium chloride | 0.45 |
| Vitamins A, D, and E | 0.05 |
| Vitamin B mixture | 0.10 |
| Mineral mixture | 0.10 |
| Amprolium | 0.09 |

The thiopeptins mixture and the mycelium cake were added to the basal ration in an amount of 2.5 p.p.m. or 10 p.p.m. with 1 percent by weight defatted rice bran while the amount of the bran was reduced to 0.975 or 0.9 percent, respectively.

EXAMPLE 9

The three groups of six pigs, each on an equalized weight basis, were experimented. The treatment groups were fed with the basal ration, as listed below, containing thiopeptin $A_1$, $A_3$, and B at a level of 20 p.p.m. or 100 p.p.m. The results on an improvement in daily weight gain and in feed efficiency are shown in Table 8 as below.

The basal ration which was fed to pigs has the following ingredients in percentage by weight:

| Ingredients | Percentages |
|---|---|
| Corn | 49.25 |
| Milo | 15.00 |
| Soybean meal | 8.00 |
| Fish meal | 4.00 |
| Defatted rice bran | 18.00 |
| Alfalfa | 3.00 |
| Calcium carbonate | 1.20 |
| Tricalcium phosphate | 0.90 |
| Sodium chloride | 0.40 |
| Vitamins A, D, and E | 0.05 |
| Vitamin B mixture | 0.10 |
| Mineral mixture | 0.10 |

EXAMPLE 10

The four groups of 20 hatched chicks were experimented; the two for treatment and another two for control. The control groups were fed with the basal ration composed of the materials as listed below. The treatment groups were fed with the feed mixture at levels of 2 p.p.m. of thiopeptin $A_4$ and the results were shown in Table 9.

The basal rations have the following ingredients in percentages by weight:

Basal Ration (A)

| Ingredients | Percentages |
|---|---|
| Corn | 52.46 |
| Milo | 14.00 |
| Soybean meal | 20.00 |
| Fish meal | 8.00 |
| Alfalfa | 3.00 |
| Calcium phosphate | 1.00 |
| Calcium carbonate | 0.70 |
| Sodium chloride | 0.45 |
| Vitamins A, D, and E | 0.05 |
| Vitamin B mixture | 0.10 |
| Preparation of 25% Amprolium | 0.09 |
| Preparation of 0.2% Pyrimethamine | 0.05 |
| Mineral mixture | 0.10 |

Basal Ration (B)

| Ingredients | Percentages |
|---|---|
| Corn | 55.26 |
| Milo | 20.00 |
| Soybean meal | 14.00 |
| Fish meal | 5.00 |
| Alfalfa | 3.00 |
| Calcium phosphate | 1.00 |
| Calcium carbonate | 0.90 |
| Sodium chloride | 0.45 |
| Vitamins A, D, and E | 0.05 |
| Vitamin B mixture | 0.10 |
| Mineral mixture | 0.10 |
| Preparation of 25 % Amprolium | 0.09 |
| Preparation of 0.2 % Pyrimethamine | 0.05 |

Thiopeptin $A_4$ was added to the mixtures in an amount of 2 p.p.m. with 0.1 percent by weight cornstarch while corn was reduced to 52.36 percent in the basal ration (A) and to 55.16 percent in the basal ration (B).

The basal ration (A) and the mixture of thiopeptin $A_4$ with said basal were fed for 4 weeks to the hatched chicks, and the basal ration (B) and such mixture fed since the fifth week.

EXAMPLE 11

The four groups of 50 hatched chicks, each on an equalized weight basis, were experimented. The two control groups were fed with the basal ration as listed below, and the two treatment groups fed with the feed mixture at levels of 1 p.p.m. of thiopeptin $A_4$. The results are shown in Table 10.

The basal rations have the following ingredients in percentages by weight:

Basal Ration (C)

| Ingredients | Percentages |
|---|---|
| Corn | 45.00 |
| Milo | 20.00 |
| Fish meal | 7.00 |
| Soybean meal | 23.00 |
| Alfalfa meal | 2.40 |
| Calcium phosphate | 0.70 |
| Calcium carbonate | 1.30 |
| Sodium chloride | 0.25 |
| Preparation of 25% Amprolium | 0.13 |
| Vitamins A and D | 0.05 |
| Vitamin B mixture | 0.09 |
| Mineral mixture | 0.03 |
| DL-Methionine | 0.05 |

Basal Ration (D)

| Ingredients | Percentages |
|---|---|
| Corn | 40.00 |
| Milo | 20.00 |
| Soybean meal | 20.00 |
| Fish meal | 5.00 |
| Defatted rice bran | 6.00 |
| Fat | 4.00 |
| Alfalfa meal | 2.40 |
| Calcium carbonate | 1.20 |
| Calcium phosphate | 0.80 |
| Sodium chloride | 0.25 |
| Preparation of 25% Amprolium | 0.08 |
| Preparation of Ethoxyquin | 0.05 |
| Mineral mixture | 0.03 |
| Vitamins A and D | 0.05 |
| Vitamin B mixture | 0.09 |
| DL-Methionine | 0.05 |

The basal ration (C) and the mixture of thiopeptin $A_4$ with said basal were fed for 4 weeks to the hatched chicks, and thereafter the basal (D) and the mixture thereof fed.

EXPERIMENTAL RESULTS

TABLE 5

| | Basal Ration | Thiopeptin $A_1$ and $A_3$ | |
|---|---|---|---|
| | | 5 p.p.m. | 20 p.p.m. |
| Average Initial Weight (Grams) | 36.80 | 36.80 | 36.80 |
| Average Final Weight (Grams) | 627.08 | 666.66 | 659.57 |
| Average Biweekly Gain (Grams) | | | |
| 0 – 2 Weeks | 201.05 | 237.85 | 213.40 |
| 2 – 4 Weeks | 389.23 | 398.37 | 409.37 |
| Feed:Gain Ratio | 1.82 | 1.80 | 1.78 |

TABLE 6

| | Basal Ration | Thiopeptin B | |
|---|---|---|---|
| | | 5 p.p.m. | 20 p.p.m. |
| Average Initial Weight (Grams) | 37.00 | 37.00 | 37.00 |
| Average Final Weight (Grams) | 614.63 | 629.16 | 637.50 |
| Average Biweekly Gain (Grams) | | | |
| 0 – 2 Weeks | 200.85 | 215.29 | 217.79 |
| 2 – 4 Weeks | 376.78 | 376.87 | 382.71 |
| Feed:Gain Ratio | 1.80 | 1.74 | 1.79 |

TABLE 7

| | Basal Ratio | Thiopeptin A & B | | Mycelium cake | |
|---|---|---|---|---|---|
| | | 2.5 ppm | 10 ppm | 2.5 ppm | 10 ppm |
| Average Initial Weight (Grams) | 37.7 | 37.7 | 37.7 | 37.7 | 37.7 |
| Average Final Weight (Grams) | 549.3 | 583.4 | 580.7 | 577.1 | 579.6 |
| Average Biweekly Gain (Grams) | | | | | |
| 0 – 2 Weeks | 193.9 | 195.9 | 199.0 | 204.4 | 199.0 |
| 2 – 4 Weeks | 307.7 | 349.8 | 344.0 | 334.7 | 342.9 |
| Feed:Gain Ratio | 1.97 | 1.89 | 1.89 | 1.88 | 1.87 |

TABLE 8

| | Basal Ratio | Thiopeptins $A_1$, $A_3$ & B | |
|---|---|---|---|
| | | 20 p.p.m. | 100 p.p.m. |
| Average Initial Weight (Kg.) | 19.75 | 19.75 | 19.75 |
| Average Final Weight (Kg.) | 44.42 | 45.70 | 47.27 |
| Average Gain (Kg.) | | | |
| 0 – 4 Weeks | 15.72 | 15.65 | 17.67 |
| 4 – 6 Weeks | 8.92 | 9.60 | 9.85 |
| Feed:Gain Ratio | 2.91 | 2.83 | 2.61 |

TABLE 9

| | Basal Ration | Thiopeptin $A_4$ 2 p.p.m. |
|---|---|---|
| Average Initial Weight (Grams) | 36.4 | 36.0 |
| Averare Weight | 928.2 | 1006.4 |

| | | |
|---|---|---|
| 6 Weeks (Grams) Average Final Weight (Grams) 10 Weeks | 2071.2 | 2194.0 |

TABLE 10

| | Basal Ration | Thiopeptin A$_4$ 1 p.p.m. |
|---|---|---|
| Average Initial Weight (Grams) | 43 | 43 |
| Average Final Weight (Grams) 10 Weeks | 1961 | 2183 |

It is to be understood that the invention is not to be limited to the exact details of operation or exact compounds shown and decribed, as obvious modifications and equivalents will be apparent to the person skilled in the art, or the products to any particular process for their invention, and the invention is therefore to be limited only by the scope of the appended claims.

We claim:

1. A thiopeptin selected from the group consisting of thiopeptin A$_1$, thiopeptin A$_3$, thiopeptin A$_4$, and thiopeptin B, wherein i. thiopeptin A$_1$
   a. is a pale yellow crystalline substance having melting or decomposition points between about 223°C. and about 226°C.;
   b. is stable at 60°C. for 1 hour at a pH range of about 2.0 to about 8.0;
   c. is soluble in dioxane, dimethylsulfoxide, dimethylformamide, pyridine, chloroform, and 3N-hydrochloric acid, is slightly soluble in methanol, acetone, and ethyl acetate, and is insoluble in ether, benzene, n-hexane, petroleum ether, and water;
   d. has an optical rotation $[\alpha]_D^{23} = -71°$ (c.=1 in chloroform);
   e. has an Rf value of 0.78 in a chloroform and methanol solvent system in volume ratio 10 : 1;
   f. has a molecular weight of 1637 as determined by vapor pressure method;
   g. has the following elemental analyses: c, 49.38; H, 4.93; N, 14.22; S, 11.72;
   h. has a characteristic thin-layer chromatogram pattern as shown in FIG. 1 of the accompanying document;
   i. has a characteristic ultraviolet absorption spectrum as shown in FIG. 2 of the accompanying drawing; and
   j. has a characteristic infrared absorption spectrum as shown in FIG. 5 of the accompanying drawing;

ii. thiopeptin A$_3$
   a. is a pale-yellow crystalline substance having melting or decomposition points between about 232°C. and about 236°C.;
   b. is stable at 60°C. for 1 hour at a pH range of 2.0 to about 8.0;
   c. is soluble in dioxane, dimethylsulfoxide, dimethylformamide, pyridine, chloroform, and 3N-hydrochloric acid, is slightly soluble in methanol, acetone, and ethyl acetate, and is insoluble in ether, benzene, n-hexane, petroleum ether, and water;
   d. has an optical rotation $[\alpha]_D^{23} = -10.8°$ (c.=1 in chloroform);
   e. has an Rf value of 0.60 in a chloroform and methanol solvent system in volume ratio of 10 : 1;
   f. has a molecular weight of 1972 as determined by vapor pressure method;
   g. has the following elemental analyses: c, 48.45; H, 5.11; N, 14.46; S, 12.09;
   h. has a characteristic thin-layer chromatogram pattern as shown in FIG. 1 of the accompanying document;
   i. has a characteristic ultraviolet absorption spectrum as shown in FIG. 3 of the accompanying drawing;
   j. has a characteristic infrared absorption spectrum as shown in FIG. 6 of the accompanying drawing;

iii. thiopeptin A$_4$
   a. is a pale yellow crystalline material having melting and decomposing points at 236°C. to 245°C.;
   b. is soluble in dioxane, dimethysulfoxide, pyridine and chloroform; slightly soluble in methanol, acetone and ethyl acetate; and insoluble in ether, benzene, petroleum ether and water;
   c. is stable at 60°C. for 1 hour at a pH range of about 2.0 to about 8.0;
   d. has an optical rotation of $[\alpha]_D^{23} = -8.5°$ (c.=1.0 in chloroform);
   e. has Rf values of 0.50 in a chloroform-methanol solvent mixture in a volume ratio of 9 : 1; 0.30 in a chloroform methanol solvent mixture in a volume ratio of 19 : 1; 0.38 in a chloroform-n-butanol in a volume ratio of 6 : 1; 0.57 in an ethylacetate-n-hexane-2N-ammonia solvent mixture in a volume ratio of 4 : 1 : 1; and 0.38 in a methanol-acetic acid-water in a volume ratio of 25 : 3 : 72;
   f. has a molecular weight of 1854 as determined by vapor pressure method having the following analysis: C = 50.13; H = 5.30; N = 15.22; and S = 12.02;
   g. has a characteristic ultraviolet absorption spectrum as shown in FIG. 8 of the accompanying document; and
   h. has a characteristic infrared absorption spectrum as shown in FIG. 9 of the accompanyng document; and (iv) thiopeptin B
   a. is a pale-yellow crystalline material having melting or decomposition points between about 219°C. and about 222°C.;
   b. is stable at 60°C. for 1 hour at a pH range of about 2.0 to about 8.0;
   c. is soluble in dioxane, dimethylsulfoxide, dimethylformamide, pyridine, chloroform, and 3N-hydrochloric acid, is slightly soluble in methanol, acetone, and ethyl acetate, and is insoluble in ether, benzene, n-hexane, petroleum ether, and water;
   d. has an optical ration $[\alpha]_D^{23} = -80°$ (c.=1 in chloroform);
   e. has an Rf value of 0.19 in a chloroform and methanol solvent system in volume ratio of 10 : 1 ;
   f. has a molecular weight of 1942 by vapor pressure method;
   g. has the following elemental analyses: C, 48.73; H, 4.87; N, 14.30; S, 11.04;
   h. has a characteristic thin-layer chromatogram pattern as shown in FIG. 1 of the accompanying document;
   i. has a characteristic ultraviolet absorption spectrum as shown in FIG. 4 of the accompanying drawing; and
   j. has a characteristic infrared absorption spectrum as shown in FIG. 7 of the accompanying drawing.

2. A component thiopeptin $A_1$, in which the component has the following natures which:
   a. is a pale yellow crystalline material having melting or decomposition points between about 223° C. and about 226° C.;
   b. is stable at 60° C. for 1 hour at a pH range of about 2.0 to about 8.0;
   c. is soluble in dioxane, dimethylsulfoxide, dimethylformamide, pyridine, chloroform, and 3N-hydrochloric acid, is slightly soluble in methanol, acetone, and ethyl acetate, and is insoluble in ether, benzene, n-hexane, petroleum ether, and water;
   d. has an optical rotation $[\alpha]D/23 = -71°$ (c. 1 in chlorofrorm);
   e. has an Rf value of 0.78 in a chloroform and methanol solvent system in volume ratio of 10 : 1;
   f. has a molecular weight of 1637 as determined by vapor pressure method;
   g. has the following elemental analyses: C, 49.38; H, 4.93; N, 14.22; S, 11.72;
   h. has a characteristic thin-layer chromatogram pattern as shown in FIG. 1 of the accompanying document;
   i. has a chracteristic ultraviolet absorption spectrum as shown in FIG. 2 of the accompanying drawing; and
   j. has a characteristic infrared absorption spectrum as shown in FIG. 5 of the accompanying drawing.

3. A component thiopeptin $A_3$, in which the component has the following natures which:
   a. is a pale-yellow crystalline substance having melting or decomposition points between about 232° C. and about 236° C.;
   b. is stable at 60° C. for 1 hour at a pH range of about 2.0 to about 8.0;
   c. is soluble in dioxane, dimethylsulfoxide, dimethylformamide, pyridine, chloroform, and 3N-hydrochloric acid, is slightly soluble in methanol, acetone, and ethyl acetate, and is insoluble in ether, benzene, n-hexane, petroleum ether, and water;
   d. has an optical rotation $[\alpha]_D^{23} = -10.8°$ (c.=1 in chloroform);
   e. has an Rf value of 0.60 in a chloroform and methanol solvent system in volume ratio of 10 : 1;
   f. has a molecular weight of 1972 as determined by vapor pressure method;
   g. has the following elemental analyses: C, 48.45; H, 5.11; N, 14.46; S, 12.09;
   h. has a characteristic thin-layer chromatogram pattern as shown in FIG. 1 of the accompanying document;
   i. has a characteristic ultraviolet absorption spectrum as shown in FIG. 3 of the accompanying drawing; and
   j. has a characteristic infrared absorption spectrum as shown in FIG. 6 of the accompanying drawing.

4. A component thiopeptin $A_4$, in which the component has the following natures which:
   a. is a pale yellow crystalline material having melting and decomposing points at 236 °C. to 245 °C.;
   b. is soluble in dioxane, dimethylsulfoxide, pyridine and chloroform; slightly soluble in methanol, acetone and ethyl acetate; and insoluble in ether, benzene, petroleum ether and water;
   c. is stable at 60°C. for 1 hour t a pH range of about 2.0 to about 8.0;
   d. has an optical rotation of $[\alpha]_D^{23} = -81.5°$ (c.=1.0 in chloroform);
   e. has Rf values of 0.50 in a chloroform-methanol solvent mixture in a volume ratio of 9 : 1; 0.30 in a chloroform methanol solvent mixture in a volume ratio of 19 : 1; 0.38 in a chloroform-n-butanol in a volume ratio of 6 : 1; 0.57 in an ethyl acetate-n-hexane-2N-ammonia solvent mixture in a volume ratio of 4 : 1 : 1; and 0.38 in a methanol-acetic acid-water in a volume ratio of 25 : 3 : 72;
   f. has a molecular weight of 1854 as determined by vapor pressure method having the following analysis : C=50.13; H = 5.30; N = 15.22; and S = 12.02;
   g. has a characteristic ultraviolet absorption spectrum as shown in FIG. 8 of the accompanying document; and
   h. has a characteristic infrared absorption spectrum as shown in FIG. 9 of the accompanying document.

5. A component thiopeptin B, in which the component has the following natures which:
   a. is a pale-yellow crystalline material having melting or decomposition points between about 219° C. and about 222° C.;
   b. is stable at 60° C. for 1 hour at a pH range of about 2.0 to about 8.0;
   c. is soluble in dioxane, dimethylsulfoxide, dimethylformamide, pyridine, chloroform, and 3N-hydrochloric acid, is slightly soluble in methanol, acetone, and ethyl acetate, and is insoluble in ether, benzene, n-hexane, petroleum ether, and water;
   d. has an optional rotation $[\alpha]_D^{23} = -80°$ (c.=1in chloroform);
   e. has an Rf value of 0.19 in a chloroform and methanol solvent system in volume ratio of 10 : 1;
   f. has molecular weight of 1942 by vapor pressure method;
   g. has the following elemental analyses: C, 48.73; H, 4.87; N, 14.30; S, 11.04;
   h. has a characteristic thin-layer chromatogram pattern as shown in FIG. 1 of the accompanying document;
   i. has a characteristic untroviolet absorption spectrum as shown in FIG. 4 of the accompanying drawing; and
   j. has a characteristic infrared absorption spectrum as shown in FIG. 7 of the accompanying drawing.

6. A process for the production of thiopeptin which comprises culturing *Streptomyces tateyamensis* A.T.C.C. 21.389 under submerged aerobic conditions in an aqueous nutrient medium containing a source of carbon and a source of nitrogen at about 24°C. to about 37°C. in about pH 5.2 to about pH 7.0 for a period of about 2 days to about 6 days until substantial antibiotic activity is imparted to said medium by the production of thiopeptin and recovering thiopeptin from said medium.

7. A process according to claim 6, in which the fermentation is conducted at a temperature of about 27 °C. to about 32 °C. in about pH 5.6 to about pH 6.2.

8. a process according to claim 6, in which a sulphur containing compound, N-acetyl-DL-methionine or sodium sulphate, is added to the medium.

9. Thiopeptin prepared by the process of claim 6.

* * * * *

PO-1050
(5/69)

UNITED STATES PATENT OFFICE
CERTIFICATE OF CORRECTION

Patent No. 3,761,587　　　　　Dated Sept. 25, 1973

Inventor(s) Norimasa Miyairi et al.

It is certified that error appears in the above-identified patent and that said Letters Patent are hereby corrected as shown below:

On page 1, column 1, add --Claims priority, application Japan, June 12, 1968, 40386/68; Nov. 21, 1969, 93881/69--.

Signed and sealed this 24th day of September 1974.

(SEAL)
Attest:

McCOY M. GIBSON JR.
Attesting Officer

C. MARSHALL DANN
Commissioner of Patents